United States Patent
Tani

(10) Patent No.: US 7,940,621 B2
(45) Date of Patent: May 10, 2011

(54) DISK RECORDING DEVICE

(75) Inventor: Hironori Tani, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 642 days.

(21) Appl. No.: 12/108,086

(22) Filed: Apr. 23, 2008

(65) Prior Publication Data

US 2008/0267030 A1   Oct. 30, 2008

(30) Foreign Application Priority Data

Apr. 25, 2007   (JP) .................. 2007-115173

(51) Int. Cl.
*G11B 20/18* (2006.01)
(52) U.S. Cl. .................. 369/53.36; 369/47.14
(58) Field of Classification Search .......... None
See application file for complete search history.

(56) References Cited

U.S. PATENT DOCUMENTS

| 7,017,078 B2* | 3/2006 | Frimout .................. 714/20 |
| 2003/0068159 A1* | 4/2003 | De Haan .................. 386/95 |
| 2004/0136693 A1* | 7/2004 | Iwasaki et al. .................. 386/95 |
| 2006/0008250 A1* | 1/2006 | Wang .................. 386/95 |
| 2008/0131082 A1* | 6/2008 | Tani et al. .................. 386/95 |

FOREIGN PATENT DOCUMENTS

JP   2005190563   7/2005

* cited by examiner

*Primary Examiner* — Christopher R Lamb
(74) *Attorney, Agent, or Firm* — Pillsbury Winthrop Shaw Pittman, LLP

(57) ABSTRACT

The disk recording device of the present invention includes a recording means and a file system recording means. The recording means performs recording of an image signal upon a recordable type optical disk. The file system recording means includes an address information search means and an address information recording means. If the recording of the file system has failed, the address information recording means records the address information in the lead-in region, but does not thus record the address information if it is already recorded in the lead-in region, or the like.

2 Claims, 5 Drawing Sheets

DISK RECORDING DEVICE

CROSS REFERENCE

This Nonprovisional application claims priority under 35 U.S.C. §119(a) on Patent Application No. 2007-115173 filed in Japan on Apr. 25, 2007, the entire contents of which are hereby incorporated by reference.

BACKGROUND OF THE INVENTION

A device is per se known which records images upon a recordable (not rewritable) DVD+R type optical disk using the DVD+VR format, which is a video recording standard. Generally, for reading data which has been recorded upon a disk, it is necessary to read a file system in which file control information has been stored, and to read out at what address upon the optical disk this data is recorded. With regard to this recording and reading of a file system upon a DVD+R, makers can establish this freely, provided that the state is non-finalized.

For example, as a method for recording the file system, when additional recording of data in the data region has once finished, an RSAT (Reserved Space Allocation Table) region is provided next onward from the address position at which this additional recording finished, and recording of this file system is performed. In the prior art, if the recording of the RSAT has failed, it has been necessary to search for an RSAT 51 over the entire extent of the disk. Since this is not practical because it would take too long, such a disk has been processed as a disk which is no longer usable.

In Japanese Laid-Open Patent Publication 2005-190563, there is disclosed an optical disk recording and replay device which, if after the recording of new AV data is finished it is determined that the recording of the data is not normal, records the file system in the management region (the lead-in region) and makes the subsequent records unavailable, and prohibits updating of the file system, thus preserving the AV data specified by the previous file system so that it can be read out.

However, with the structure disclosed in Japanese Laid-Open Patent Publication 2005-190563, there is the problem that, if the file system cannot be recorded, then the file system is recorded in the management region (the DMA region) and updating of the file system is prohibited, so that thereafter it is not possible to perform recording even if some space remains upon the disk, so that there has been the problem that the convenience of use is bad.

Thus the object of the present invention is to provide a disk recording device which enhances the reliability during preservation of the previously recorded files, when recording of the file system (corresponding to the RSAT described above) of a non-finalized optical disk has not proceeded normally.

SUMMARY OF THE INVENTION

The disk recording device of the present invention includes a recording means and a file system recording means.

The recording means performs recording of an image signal upon a recordable (not rewritable) type optical disk which has a lead-in region in which management information and so on for the optical disk is recorded, and a data region for recording data.

The file system recording means, along with recording the image signal, also performs recording of a file system for the optical disk in the data region.

The file system recording means includes an address information search means and an address information recording means.

The address information search means acquires in advance, from a prescribed position, address information of the most recent file system before the recording of the file system fails.

And, if the recording of the file system has failed, the address information recording means inputs the address information of the most recent file system, and records the address information in the lead-in region.

Moreover, in any one of cases (A) through (C) below, the address information recording means does not record the address information:
(A) if the address information recorded by the address information recording means is already recorded in the lead-in region.
(B) if a region, in the lead-in region, reserved for recording of the address information has become filled with the address information data.
(C) if the address information which has been inputted has an invalid value.

DETAILED DESCRIPTION OF THE INVENTION

Figure 1:
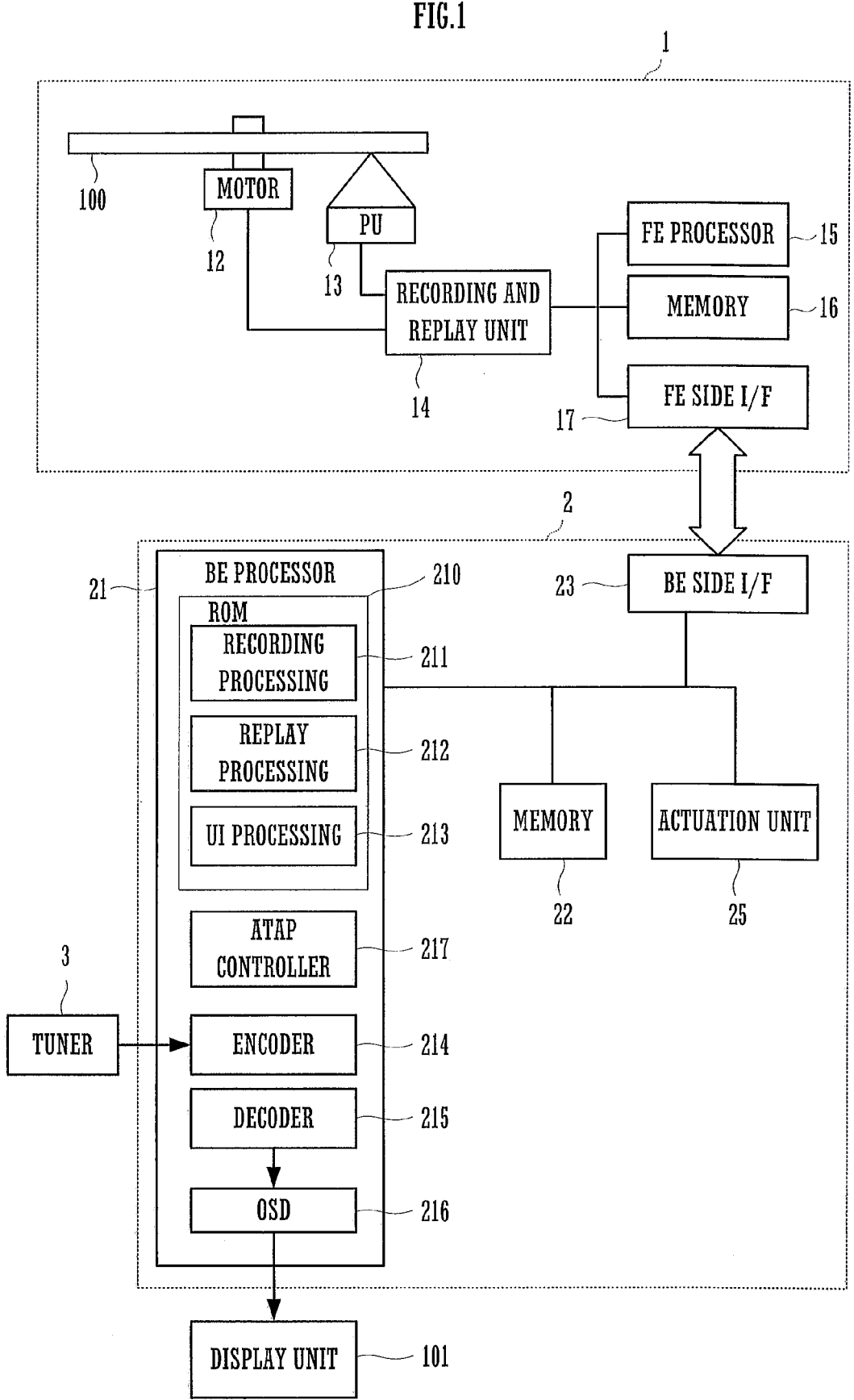
FIG. 1 is a block diagram showing the structure of an optical disk recording and replay device according to an embodiment of the present invention.

Using FIG. 1, the structure of an optical disk recording device according to one embodiment of the present invention will now be explained. The recording device comprises a disk drive device 1 and a higher level device 2 which controls it. Moreover, a tuner 3 and a display unit 101 are connected to the recording device.

The disk drive device 1 comprises a spindle motor 12, a PU (pickup head) 13, a recording and replay unit 14, an FE (front end) processor 15, a memory 16, and an FE side I/F (interface) 17.

The spindle motor 12 rotates an optical disk (a DVD or a CD) 100 which is loaded.

The PU 13 creates data for recording information optically upon the optical disk 100, and reads out information from the disk 100.

The recording and replay unit 14 drives the spindle motor and optical pickup, and performs recording of information upon the optical disk 100 and replaying of information which is recorded upon the optical disk 100.

The FE (front end) processor 15 consists of a system LSI and comprises a CPU, a RAM, a ROM, and other functional blocks, and controls the various structural elements of the disk drive device 1.

The memory 16 comprises a region which stores programs and data required for the processing by the FE processor 15, buffer regions for recording data and replay data, a region for an intermediate buffer when converting to data used by the recording and replay unit 14, and the like.

The FE side I/F (interface) 17 performs sending and reception of data to and from the higher level device 2.

The higher level device 2 comprises a BE processor 21, a memory 22, a BE side I/F 23, an actuation unit 25, and the like.

The BE processor 21 may consist of a system LSI. The BE processor 21 comprises a CPU, a ROM, and various functional blocks (an ATAPI controller 217, an encoder 214, a decoder 215, and an OSD processing unit 216), and executes a program within the ROM, thus controlling the various structural elements within the higher level device 2.

The ROM 210 stores subroutines for performing recording processing 211, replay processing 212, and UI (User Interface) processing 213. The recording processing 211 includes RSAT recording processing, most recent RSAT search processing, and RSAT address information recording processing. A RSAT (Reserved Space Allocation Table) is a file system which is recorded in a predetermined position upon the DVD+R optical disk, and is disk management information in which file information for controlling files recorded upon that optical disk is described.

In the RSAT recording processing, the BE processor 21 records a RSAT which uses the disk drive device 1 upon the DVD+R optical disk. After having recorded the files, the processor 21 may, for example, record the RSAT in the address region behind the files.

In the most recent RSAT search processing, the BE processor 21 searches for address information of the RSAT which was already recorded, before recording of the RSAT ends in failure. And the RSAT address information recording processing is processing in which, if recording of the RSAT has failed, the most recent RSAT address information found by the most recent RSAT search processing (the leading position at which the RSAT is recorded) is stored in the lead-in region.

The search method for the RSAT in the most recent RSAT search processing is performed by finding the final portion which has been recorded upon the disk (termed the "first prescribed position"), or by acquiring the address information (the address position indicated by that address information is termed the "second prescribed position") recorded in the lead-in region 105 (refer to FIG. 2) by the RSAT address information recording processing. It should be understood that this first and second prescribed position correspond to the "prescribed position" of the Claims.

The timing of searching for the address information may be any one of when the disk is loaded, when the disk drive device 1 is started, or during replay. Furthermore, if the recording of the newest RSAT has succeeded, then address information which specifies the address position at which this RSAT is recorded is stored in the memory 22. At whichever timing the searching for the address information may be performed, address information stored in advance before the recording of the RSAT fails is searched for and is acquired. Since the searching is performed before recording in this manner, accordingly, when subsequently a failure occurs in the recording of the RSAT, then it is possible to preserve the most recent RSAT, even without searching through the entire optical disk, so that it is possible to preserve the files which this RSAT manages.

The replay processing 212 includes first replay processing, presence/absence decision processing for RSAT address information, and second replay processing. In the first replay processing, if the most recent RSAT has been found in the first prescribed position, analysis of the file system and the control information is performed using this RSAT, and replay is started. In the presence/absence decision processing for RSAT address information, if the most recent RSAT has not been found in the first prescribed position, a decision is made as to whether or not the RSAT address information is present within the lead-in region. Here, in this embodiment, since the RSAT is recorded after recording the files, the first prescribed position corresponds to the position after the final file.

In the second replay processing, when it has been decided that the RSAT address information is not present in the first prescribed position, then the second prescribed position is obtained from the RSAT address information which is stored in the lead-in region. For example 531 in FIGS. 3 and 511 in FIG. 4, which will be described hereinafter, correspond to the second prescribed position. The RSAT which is recorded in this prescribed position is read out, the file system and control information are acquired, and these are analyzed and replay is started.

In the UI (user interface) processing 213, the BE processor 21 outputs a command to the OSD processing unit 216, and the processing unit 216 outputs a predetermined OSD (On Screen Display) to the display unit 101. Furthermore, the BE processor 21 receives various types of actuation input from the actuation unit 25 corresponding to the OSD which is being outputted. For example, actuation input for a recording command may be inputted. In this case, the processor 21 encodes an image signal which is inputted from the tuner 3 using the encoder 214, and executes the subroutine for recording processing 211 upon the encoded image signal. Furthermore, during replay, it would also be acceptable for the UI processing 213 to arrange for the processor 21 to display thumbnail images, so that the user may perform guidance to designate the file to be replayed.

Furthermore, when actuation input of a replay command has been received, the BE processor 21 performs the subroutine for replay processing 212, and replays the predetermined file.

The ATAPI controller 217 reads out data from the optical disk 100 from the BE side I/F 2 via the FE side I/F 17, and controls the recording of data upon the optical disk 100.

The encoder 214 encodes the image signal inputted from the tuner to a data format for recording upon the optical disk 100. For example, it may encode the signal in the MPEG format.

The decoder 215 decodes the image signal which is inputted from the disk drive device 1 (which is, for example, in the MPEG format), and outputs it to the OSD processing unit 216.

The OSD (On Screen Display) processing unit 216 outputs characters designated by the UI processing unit 213. Furthermore, if an image signal is being inputted from the decoder 215, the OSD processing unit 216 may combine this image signal therewith, or may prohibit combination of this image signal.

The memory 22 stores data and the like required for the processing by the BE processor 21. The memory 22 comprises a buffer region for compression and expansion of image data, and a RAM region in which variables necessary for program operation are stored.

The BE side I/F 23 performs transmission and reception of data to and from the disk drive device 1.

The actuation unit 25 inputs actuation input for the higher level device 2 to the BE processor 21.

The display unit 101 outputs the signal decoded by a decoder within the BE processor 21 as a picture or a still image. It should be understood that, if the display unit 101 inputs an analog signal, a D/A converter (not shown in the figures) is inserted between it and the BE processor 21.

According to the structure described above, when recording a video and audio signal, the higher level device 2 inputs video and audio data to the BE processor 21 from the tuner 3, or from an external connection terminal not shown in the figures, and transmits it to the disk drive 1. And the disk drive device 1 records this video and audio data upon the optical disk 100. Moreover, during replay, the device 1 reads a video and audio signal from the optical disk 100, and outputs this signal as digital data with the FE processor 15. And the BE (back end) processor 21 decodes the digital data and displays it upon the display unit 101.

The tuner 3 extracts an image signal from the broadcast signal, and outputs it to the BE processor 21 of the higher level device 2.

Figure 2:
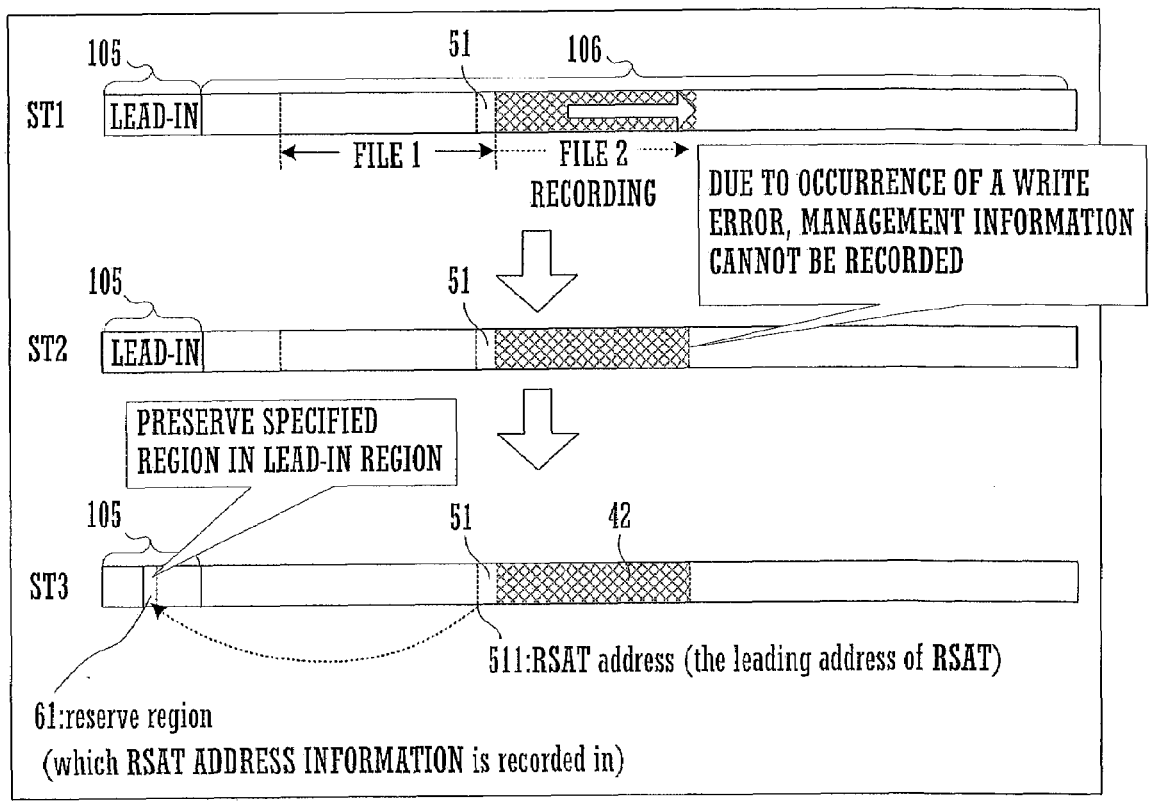
FIG. 2 is a data structure diagram for a DVD+VR optical disk, for explanation of RSAT address information recording processing for recording control in this embodiment.

With reference to FIGS. 2 through 5, the recording control for a DVD+R optical disk will now be explained in the following. FIGS. 2 through 5 are data structure figures of a DVD+VR optical disk for explanation of the recording processing of RSAT address information in this embodiment. FIG. 2 shows stages ST1 through ST3, and shows the way in which the RSAT is recorded upon the optical disk, and the way in which the RSAT is preserved when recording has failed. It should be understood that when, in the following, a file j (where j is an integer) is referred to, this is not supposed to mean a reference symbol in the figure, but rather is supposed to mean a file number.

As shown in FIG. 2, a DVD+VR has a lead-in region 105 and a data region 106 in which files are stored (and it also has a lead-out region not shown in the figures, outside the data region 106).

The stage ST1 shows a situation in which, after the image of a file #1 has been recorded in the data recording region 106, an RSAT 51 is recorded, and thereafter, furthermore, the image of a file #2 is being recorded. A file system for all of the files which have been recorded up until this point is included in the RSAT 51. Since, in the example of ST1, only the single file #1 has been recorded, accordingly the management information for this one file is included in the RSAT 51. Since there is a limit to the capacity of the lead-in region 105, in order for this capacity not to become full, the RSAT (51 or the like) is stored in the data region until finalization. Provided that, for example, no write error occurs in the region after the image of file #2, the RSAT of the image of file #2 is recorded in addition to the contents of the file system 51 of file #1. The leading address of the RSAT recorded in the region after the image of this file #2 and the leading address of the RSAT 51 corresponds to the first prescribed position described above.

The stage ST2 shows the case when it has not been possible to record the control information after the image of file #2 has been recorded, due to the fact that a write error has occurred.

The stage ST3 shows the way in which the disk is preserved in the case of the stage ST2. If a write error occurs during recording of the file system of file #2, it is not possible to record the file system. In this case, there is a danger that it may become impossible to read out the disk.

Thus, the most recent RSAT (here, the RSAT 51) recorded before the RSAT recording fails is recorded in a different position upon the disk 100. In concrete terms, a reserve region 61 is ensured in a portion of the lead-in region 105, against the possible eventuality that it will not be possible to record the RSAT in the data region. And a RSAT address information, which shows a RSAT address 511 at which the RSAT 51 is recorded (here supposed to be the leading address), is recorded in this reserve region 61.

When a file which has been recorded is to be replayed, the device 1 searches for the final portion of the recorded portion of the disk, and, if it decides that the management information of the file 2 is not recorded, performs reading out of the reserve region 61. When reading out the region 61 and acquiring the RSAT address 511, the device 1 shifts the PU 13 to the region 61, reads out the RSAT address 511, and acquires the RSAT 51. By doing this, it is possible to preserve the files which were recorded before the failure in the recording of the RSAT (in other words, it is possible to read out these files).

It should be understood that, during subsequent finalization, the RSAT address information 511 is read out, the RSAT 51 is acquired, and the file system of this RSAT is recorded in the lead-in region in accordance with the standard. By this finalization process, the format of the disk becomes a format according to a standard which can be read by any DVD player.

Figure 3:
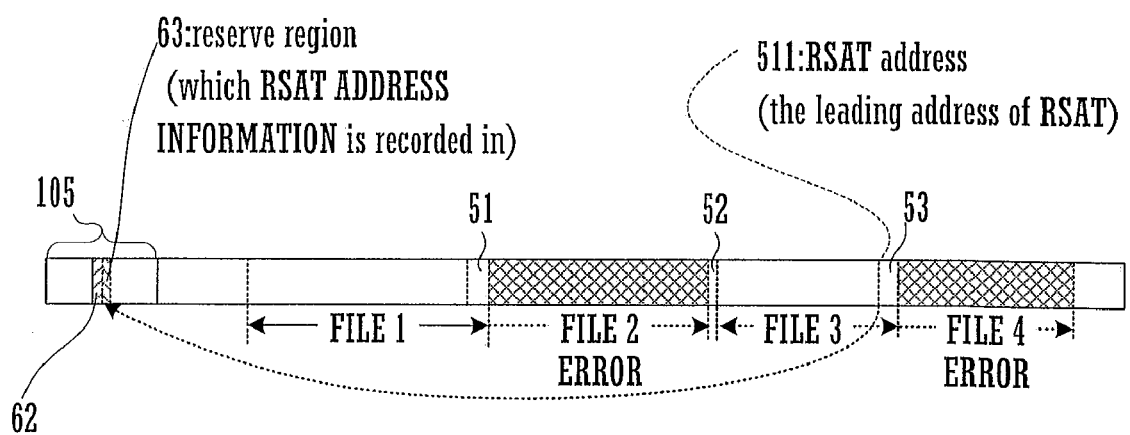
FIG. 3 is a data structure diagram for a DVD+VR optical disk, for explanation of RSAT address information recording processing in recording control of an embodiment of the present invention.

FIG. 3 shows an example of a data structure when a new file #3 has been additionally written after the stage ST3. This example shows a case in which no write error has occurred for the file #3 and it has been possible to record an RSAT 53, but a write error has occurred for a file #4. In the RSAT 53, there is recorded management information for all of the files, up to recording of the file #3, for which writing has succeeded (in other words for the files #1 and #3). At the time point that the RSAT 53 is recorded, when reading out the disk, in the same manner as in the stage ST2 of FIG. 2, the RSAT 53 is read out, and the disk is read out based upon the management information of the RSAT 53.

When recording of the file #4 has failed, the RSAT address information in the region 62 is searched for according to the most recent RSAT search processing. In the information, there is recorded a RSAT address 531 (here supposed to be the leading address of the RSAT 53) for which recording succeeded before the failure in recording of the file #4. Due to this, it is possible to read out the RSAT 53 for which recording of the file system succeeded before the failure in recording of the file #4, so that it is possible to preserve the disk. The address of the reserve region 62 corresponds to the above described "second prescribed position".

It should be understood that, instead of recording the information upon the disk, it would also be acceptable, before cutting off the power supply of the disk recording device, and before taking out the optical disk 100 which was loaded, to store in advance the RSAT address information of the RSAT 53 in the memory 22.

And the RSAT address 531 of the RSAT is recorded in the reserve region 62 which follows the region 61. Even if the recording of the RSAT of the file #4 fails, it is possible to preserve the RSAT 53 for which recording has already been successful.

In this way, a region is provided in the lead-in region 105 in which the RSAT address information (in the region 61, 62, and so on) is recorded. And, each time an error occurs in the recording of the RSAT of a file, the leading address of that RSAT region, in which is recorded the most recent RSAT for which recording has been successful, is recorded in the lead-in region 105.

Figure 4:
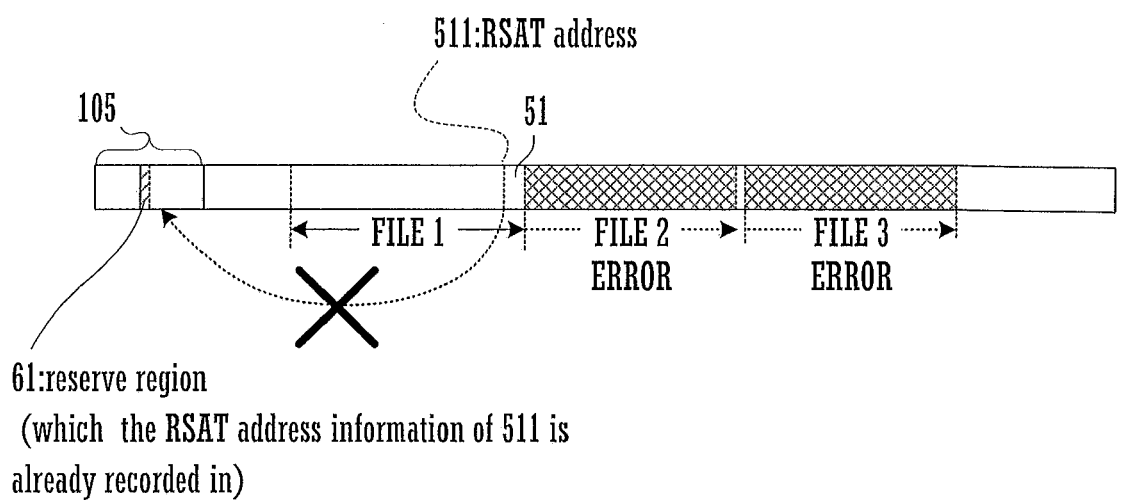
FIG. 4 is a data structure diagram for a DVD+VR optical disk, for explanation of RSAT address information recording processing by this embodiment.

FIG. 4 shows a data structure example when the recording of a new file #3 has been performed after the stage ST3 of FIG. 2. In this example, the difference from the FIG. 3 example is that it is supposed that, after the failure in recording file #2, a failure has also occurred during the recording of the RSAT of file #3 (in other words, a write error has occurred).

In this example as well, in order to preserve the RSAT of the file #1 which is the portion for which recording has been successful, it would be possible to perform processing to record the RSAT address information 511 in the lead-in region. However, the most recent RSAT for which recording has been successful is the RSAT 51. At the time point of the stage ST3 of FIG. 2, the RSAT address information 511 is already recorded in the reserve region 61 within the lead-in region 105. Accordingly, to record again in the management region 61 the same data as is already present in the management region 61, would be useless consumption of the lead-in region 105, which is limited in size. Thus, in this embodiment, if the RSAT address information is already recorded in the lead-in region 105, then the same address is not recorded in the lead-in region 105 again.

Figure 5:
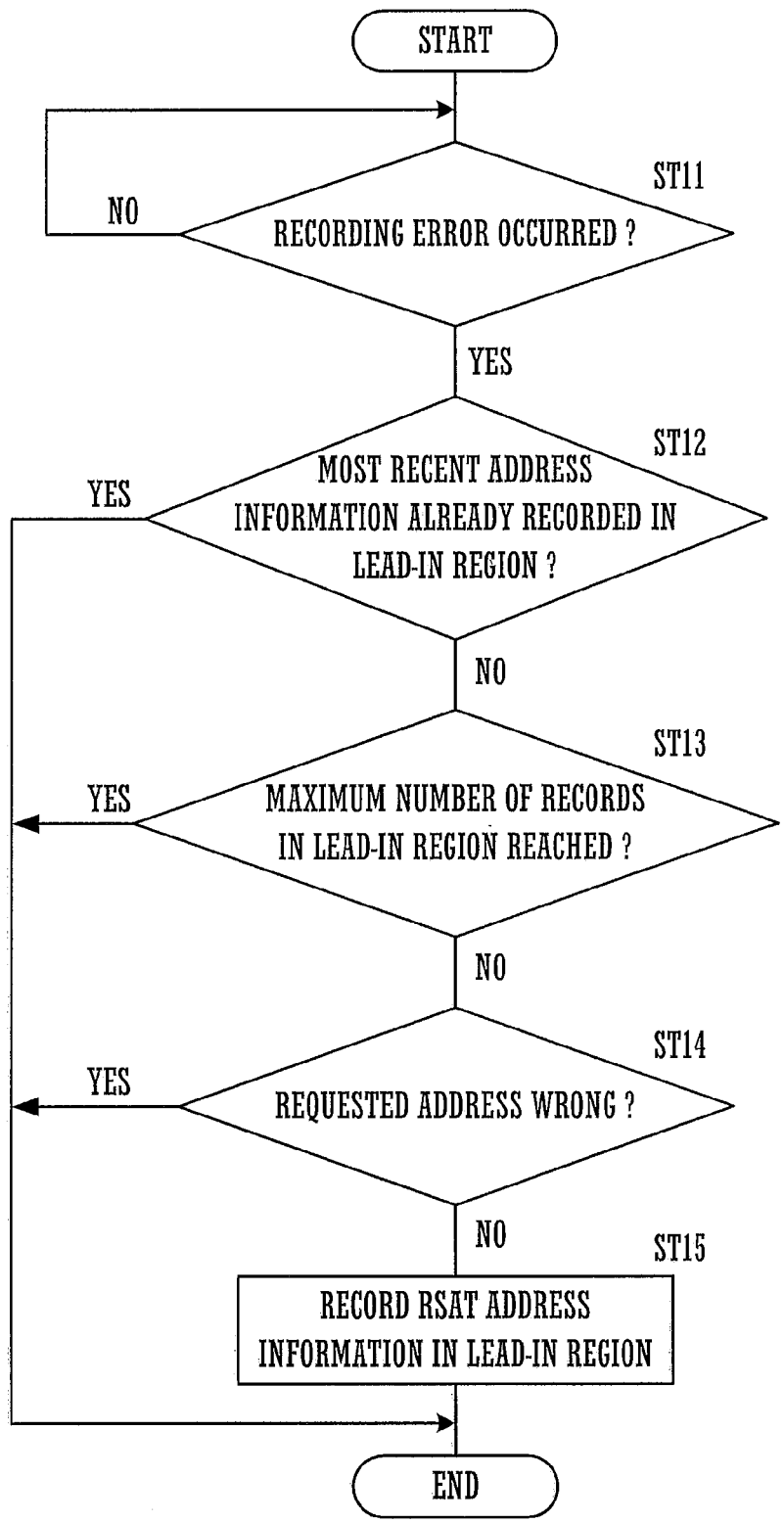
FIG. 5 shows the flow of control during recording upon a disk by the optical disk recording and replay device according to an embodiment of the present invention.

Next, using the flow chart of FIG. 5, the RSAT recording processing will be explained.

ST11: a decision is made as to whether or not a recording error has occurred. If it is decided in this step ST11 that a recording error has occurred (YES in the step ST11), then the BE processor 21 performs the steps from the step ST12 onward. But if, in this step ST11, it is decided that no recording error has occurred (NO in the step ST11), then this processing loops back so as to go into a wait state.

The decision steps of ST12 through ST14 perform processing of decisions which are preliminary to the processing of the step ST15, and, if an affirmative decision is reached in any one of these steps ST12 through ST15 (YES in any of ST12 through ST15), then the flow of this subroutine terminates immediately. However, if negative decisions are reached in all of the steps ST12 through ST15 (NO in all of ST12 through ST15), then the step ST15 is executed. In this step ST15, as shown in FIGS. 2 and 3, the most recent one among the RSATs which have already been recorded is preserved in the lead-in region 105.

ST12: As a preliminary to the step ST12, when this disk was loaded, it was decided in advance whether or not it was a non-finalized DVD+R, and, if this type of disk was indeed loaded, then the BE processor 21 acquired the most recent RSAT information by performing the most recent RSAT search processing. And the most recent address information in the lead-in region 105 is acquired (this corresponds to 63 in FIGS. 3 and 61 in FIG. 4), and it is decided whether or not the same address as the most recent RSAT is recorded. As explained above with reference to FIG. 4, if the most recent RSAT address is already recorded (YES in the step ST12), then it is useless to record the same address again. In this case, the recording processing of the step ST15 is not performed.

ST13: Since it is not possible to perform any further recording if the region which is provided in the lead-in region 105 in advance is full (YES in the step ST13), accordingly recording of the most recent RSAT address information is not performed. In this case, it is possible to preserve the data of the RSAT recorded in the address specified by the RSAT address information already recorded in the lead-in region 105. Accordingly, it is possible to preserve the file designated in this RSAT.

ST14: The RSAT recording process is a sub-process of the recording processing 211, and is executed in response to a processing request from a higher level, i.e. from the recording processing 211 or the UI processing 213. When recording the RSAT address information (the address 511, 512, and so on) in the lead-in region 105, input is received from the external higher level processing routine, and the RSAT address information is recorded in the position in the lead-in region 105 which has thus been commanded. If a defect is present in the data which has been requested by the RSAT recording processing (YES in the step ST14), then the recording processing of the step ST15 cannot be performed. Typical cases in which a defect is present in this handing over of the address are, for example, when a bug is present in the higher level processing subroutine, when the inputted value of the address to the RSAT recording processing routine is 0 or a null value, when some other impossible address value is inputted, or the like.

It should be understood that, in an implementation, it would be acceptable to provide a structure in which, among these functions, any chosen plurality thereof are integrated together into a system IC; and it would also be acceptable to provide a structure in which one or more of the shown blocks is divided into a plurality of separate blocks. For example, it would be acceptable to arrange not to separate the devices 1 and 2 with the ATAPI, but to integrate them together. And, although the address of the RSAT is stored in the lead-in region or in the memory 22, provided that it is stored, this could be done anywhere; it could be stored in the memory 16, for example. Moreover although, in the embodiment described above, a plurality of functional blocks such as the decoder 215, the OSD processing unit 216 and so on are included in the BE (back end) processor 21, it would also be acceptable for them to be provided separately. Furthermore, it would also be acceptable to arrange for the BE side I/F (interface) 23 to include the ATAPI controller 217 and a microcomputer, and for the recording processing subroutine 211 and the replay processing subroutine 212 to be stored in a ROM of this microcomputer, while the BE (back end) processor 21 includes the other structures. Even further, it would also be possible to integrate together the CPUs of the disk drive device 1 and the higher level device 2 upon a single chip.

In the above, an example of a DVD+R was explained. However, it would also be possible to apply the embodiment explained above to a device which records upon a recordable (not rewritable) type disk which has a lead-in region of limited capacity, and which, until finalization, records the file system in the data region.

What is claimed is:

1. A disk recording device, comprising:
a recording means which performs recording of an image signal upon a recordable type optical disk which has a lead-in region in which management information and so on for the optical disk is recorded, and a data region for recording data; and
a file system recording means which, along with recording said image signal, also performs recording of a file system for said optical disk in said data region;
with said file system recording means comprising:
an address information search means which acquires in advance, from a prescribed position, address information of the most recent file system before said recording of said file system fails; and
an address information recording means which, if said recording of said file system has failed, inputs said address information of said most recent file system, and records said address information in said lead-in region;
and wherein, in any one of cases (A) through (C) below, said address information recording means does not record said address information:
(A) if the address information recorded by said address information recording means is already recorded in said lead-in region;
(B) if a region, in said lead-in region, reserved for recording of said address information has become filled with said address information data;
(C) if said address information which has been inputted has an invalid value.

2. A disk recording device according to claim 1, wherein said recordable type optical disk is a DVD+R.

* * * * *